United States Patent [19]
Petranovich et al.

[11] Patent Number: 5,946,624
[45] Date of Patent: *Aug. 31, 1999

[54] SYNCHRONIZED FREQUENCY HOPPING

[75] Inventors: James E. Petranovich, Encinitas; Sheldon L. Gilbert; Steven H. Gardner, both of San Diego, all of Calif.

[73] Assignee: Pacific Communication Sciences, Inc., Fremont, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/705,514

[22] Filed: Aug. 29, 1996

[51] Int. Cl.$^6$ ....................................................... H04J 4/00
[52] U.S. Cl. ....................... 455/447; 455/422; 375/202; 375/203; 370/330; 370/436
[58] Field of Search ........................... 455/422, 446–448, 455/440, 452, 502, 503; 375/202, 203; 370/330, 436, 478

[56] References Cited

U.S. PATENT DOCUMENTS

| | | | |
|---|---|---|---|
| 4,955,082 | 9/1990 | Hattori et al. | 455/440 |
| 5,185,739 | 2/1993 | Spear | 370/330 |
| 5,408,496 | 4/1995 | Ritz et al. | 375/202 |
| 5,425,049 | 6/1995 | Dent | 375/202 |
| 5,581,548 | 12/1996 | Ugland et al. | 370/330 |

*Primary Examiner*—Wellington Chin
*Assistant Examiner*—Lee Nguyen
*Attorney, Agent, or Firm*—Merle W. Richman, III; Frank D. Nguyen; Steven A. Shaw

[57] ABSTRACT

A synchronized frequency hopping method and apparatus for use in a cellular communication system where the cellular communication systems has a plurality of cells and a plurality of frequencies available to be assigned to the cells. At predetermined times, cells in the system synchronously change or hop to a new frequency. The new frequency to which a cell hops to may be a function of the present frequency the cell is assigned. In addition, synchronized frequency hopping may occur at predetermined intervals and the pattern of hopping may periodically repeat. This technique limits the period of time a non-system source of interference may impair communications in any cell since the cell hops to different frequencies periodically.

14 Claims, 17 Drawing Sheets

FIG. 9

SYNCHRONIZED FREQUENCY HOPPING

CROSS-REFERENCE TO RELATED APPLICATIONS

This application is related to co-pending application Ser. No. 08/533,664, filed Sep. 25, 1995, entitled "TIME SHARING METHOD AND APPARATUS FOR FREQUENCY REUSE IN CELLULAR COMMUNICATION SYSTEMS," which is assigned to the same assignee and is incorporated herein by reference.

BACKGROUND OF THE INVENTION

1. Field of the Invention

This invention relates to wireless communications systems, and more particularly to cellular communication systems.

2. Description of Related Art

As noted in the application incorporated by reference above, in cellular communication systems, geographic areas or regions are typically divided into cells that are nominally hexagonally shaped. Each cell is allocated one or more radio frequency channels. In a frequency division multiple access (FDMA) system, adjacent or nearby cells are assigned separate frequencies. (The techniques described herein are primarily intended for use in FDMA systems, but may be used in time division multiple access (TDMA) or code division multiple access (CDMA) systems as well). After all available frequencies have been allocated, it is necessary to begin reusing the frequencies. For example, if seven frequencies are available, it is necessary to begin using the first frequency again starting in the eighth cell.

FIG. I is a block diagram of a prior art cell configuration showing a problem of frequency reuse Clusters of seven cells (modeled as hexagons for ease of understanding) form cell groups 1, indicated by bold lines. Seven frequencies ($F_1$ to $F_7$) are used within each cell group 1, and then reused in adjacent cell groups 1. Within each cell group 1, the pattern of frequency distribution is normally the same. Thus, the center cell of the central cell group shown uses the same frequency ($F_7$) as the center cell of adjacent cell groups ($F_7$).

Because frequencies are reused, two cells operating on the same frequency, though separated geographically, may interfere with each other. This is known as "co-channel interference". The effect of co-channel interference varies with terrain and distance. In cases where path loss conditions favor the desired signal, the co-channel interference may not be strong enough to have a significant impact on receiver performance. In other cases, path loss conditions may cause the difference between the desired carrier power and the interference (known as the "C/I" ratio) to be insufficient for good receiver performance. In many systems this occurs when the C/I ratio is below about 16–17 dB (generally indicative of significant co-channel interference), although the acceptable C/I ratio may be more or less, depending on the nature of the signal and the channel. The overall effect is to create areas within a cell where no good coverage is possible. In a case of seven total frequencies, these bad locations may comprise 40% or more of a typical cell.

The traditional way to mitigate co-channel interference in FDMA systems is to allocate a larger number of frequencies to the service and to devise sparse reuse patterns. A common allocation is a reuse factor of 21 (7 cells with three 120° sectors per cell). However, this method cannot be used when only a small number of frequencies, such as seven, are available. The application incorporated by reference teaches time sharing of limited frequencies to reduce co-channel interference.

Although this technique reduces co-channel interference from cells in the same system, it does not reduce interference from other systems. Radio frequency spectrum is tightly allocated and, thus systems having closely allocated frequency spectrum may produce interfering transmissions. In addition, other devices, such as transformers, may produce electromagnetic energy whose frequency overlaps one or more frequencies allocated to a system. It is not uncommon for non-system radio sources to generate interference sufficient to prevent communication. As the technology which enables wireless communication has become more advanced and less expensive, systems that utilize radio communication have proliferated and continue to expand in number and size. This proliferation of systems increases the probability of interference between systems. If an interfering signal occurs on one or more frequencies ($F_1$ to $F_7$) in the coverage area of a cell shown in FIG. 1, then the interfering signal could create a region in a cell where communication by users within the cell may not be possible.

Accordingly, it is desirable to limit the interference within a cell from other radio systems or non-radio system sources. The present invention provides a solution to this problem.

SUMMARY OF THE INVENTION

The present invention is a frequency hopping method and apparatus for use in cellular communication systems. A first plurality of frequencies are assigned to the system which has a second plurality of cells. In the system, each of the second plurality of cells is allocated one of the first plurality of frequencies. In the system, the second plurality of cells is reallocated another one of the first plurality of frequencies. In the preferred embodiment of the invention, the reallocation of frequencies to cells is performed synchronously.

The reallocation of a frequency to a cell may also be a function of the cell's previous frequency allocation. In addition, cells having like frequency allocations prior to reallocation may also have like frequency allocation after reallocation. In one embodiment of the invention, all of the cells may be temporary allocated the same frequency, i.e., placed in broadcast mode. After a period of time, the cells are synchronously allocated a frequency based the cell's allocation prior to be switched to the broadcast frequency. In another embodiment of the invention, only a small number (or one) of the cells are allocated one particular frequency for a period of time. So, that the(se) cell(s) have exclusive use of the frequency.

In another embodiment to reduce the probability of non-system interference after a reallocation process, the cells may be reallocated a frequency on a random basis. In addition in order to reduce system interference, cells sufficiently close to cause interference may be enabled to transmit during only selected intervals when other cells are not enabled.

BRIEF DESCRIPTION OF THE DRAWINGS

FIG. 9 is a timing diagram showing a synchronized shared frequency hopping pattern for the twenty one cell group configuration depicted in FIGS. 7 and 8.

Like reference numbers and designations in the various drawings indicate like elements.

DETAILED DESCRIPTION OF THE INVENTION

Throughout this description, the preferred embodiment and examples shown should be considered as exemplars. rather than as limitations on the present invention.

Figure 1:
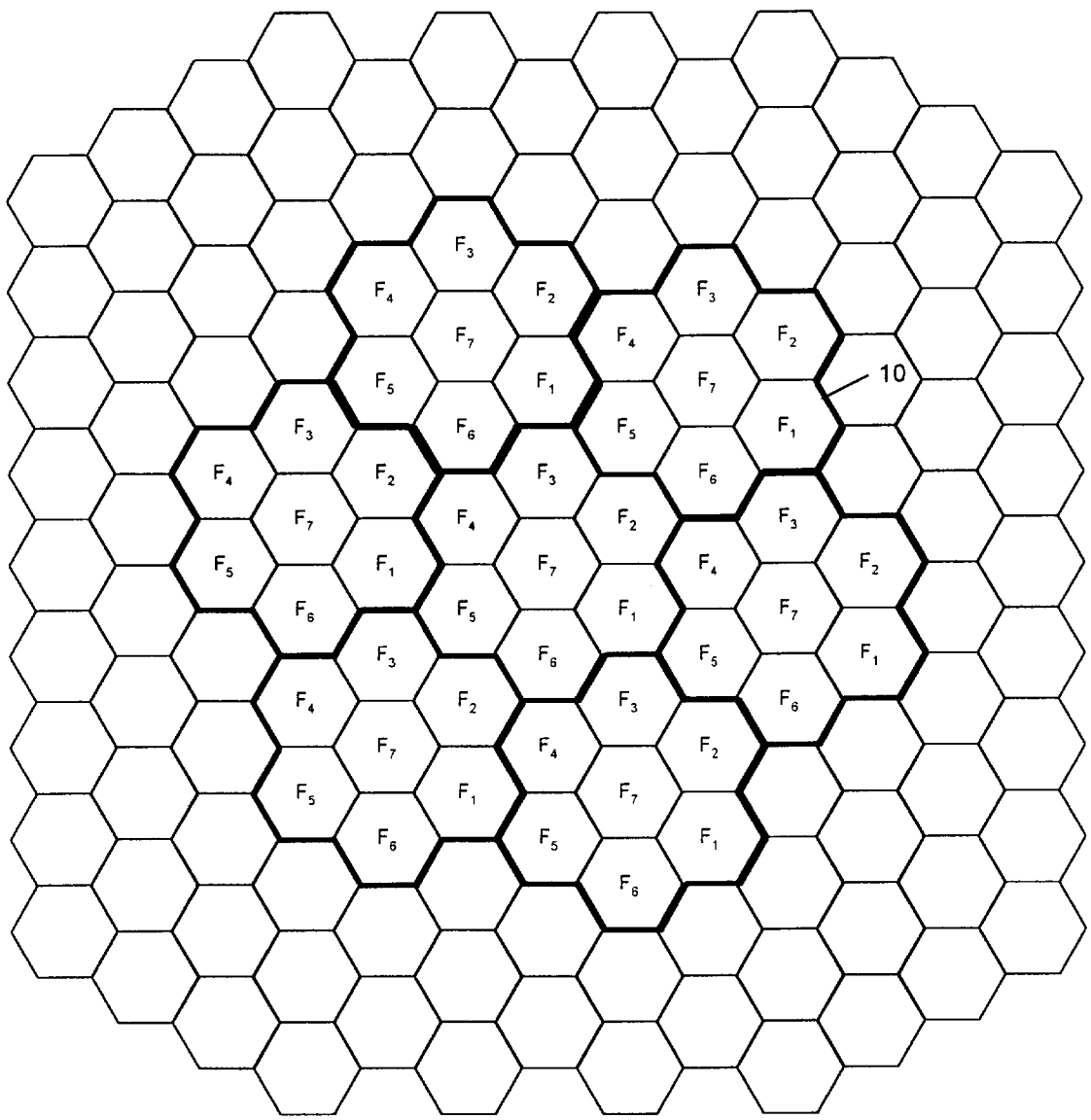
FIG. 1 is a block diagram of a prior art cell configuration showing a frequency reuse pattern for a seven cell group configuration.
Figure 2:
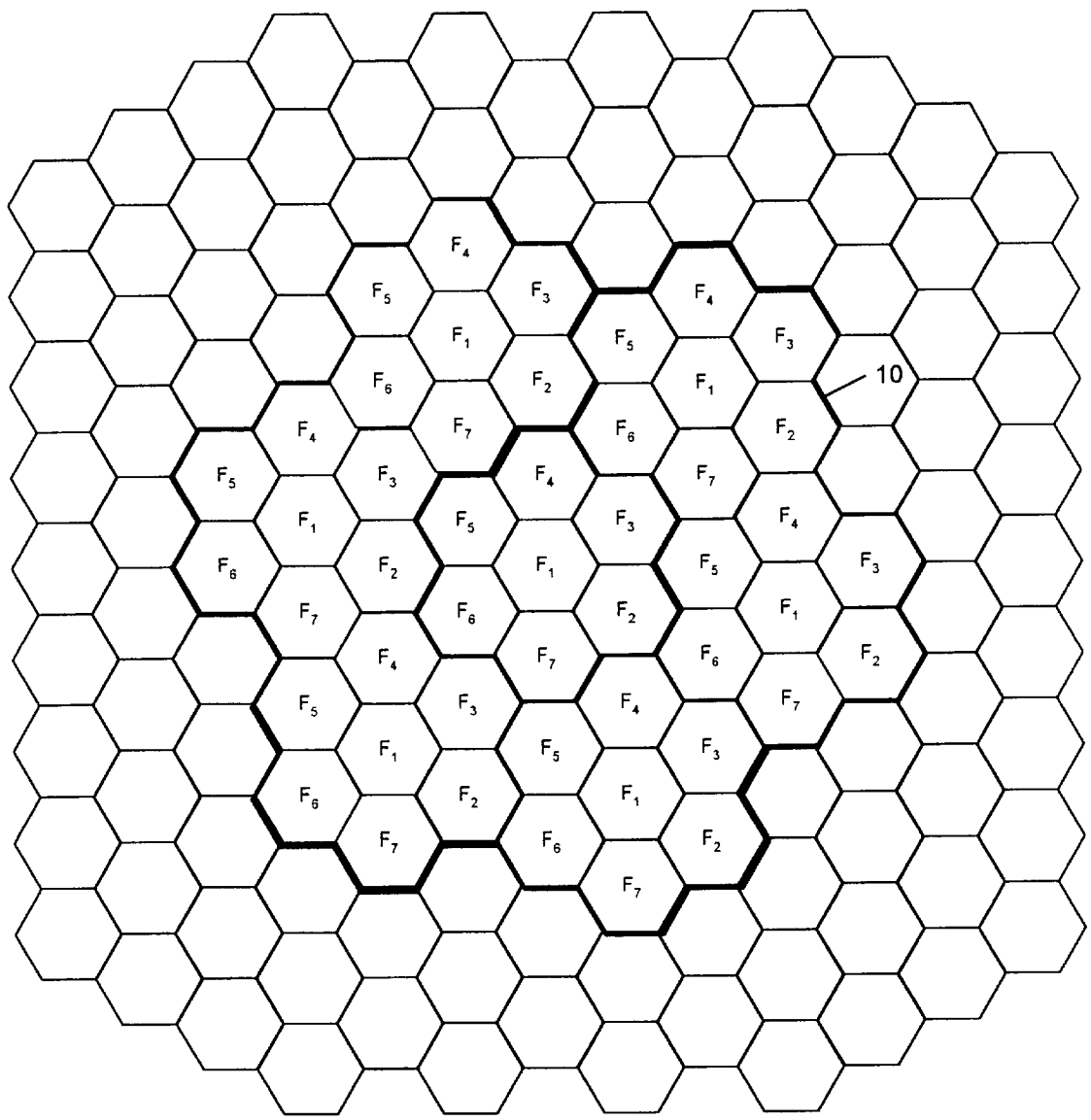
FIG. 2 is a block diagram of the cell configuration of FIG. 1 after a synchronized frequency hop.
Figure 3:
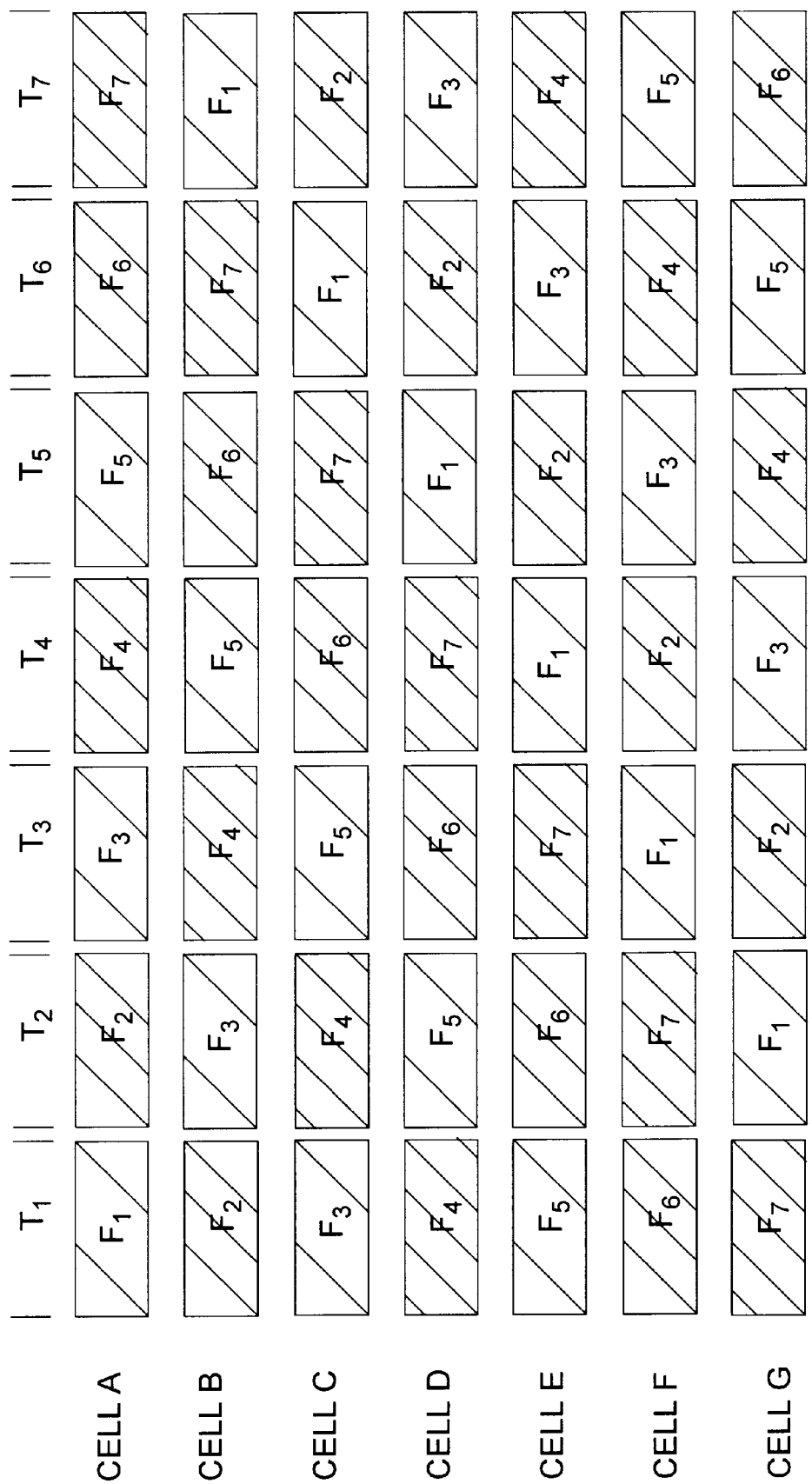
FIG. 3 is a timing diagram showing a synchronized frequency hopping pattern for the seven cell group configuration depicted in FIGS. 1 and 2.

FIGS. 1, 2, and 3 are presented to describe one embodiment of a synchronized frequency hopping pattern according to the present invention. In the frequency plan shown FIG. 1, each cell is assigned a particular frequency ($F_1$ to $F_7$), for example cell 10 has been assigned frequency $F_1$. The frequency pattern employs a seven cell configuration based on the seven frequencies. The assignment of frequencies to each cell is identical from cell group to cell group to minimize co-channel interference from other cells in the same system. For example, frequency $F_7$ has been assigned to the center cell of each cell group and frequency $F_1$ has been assigned to the lower right cell 10 in each cell group. This pattern limits co-channel interference between cells in the system but does not limit interference from another system. For example, if another radio system or non-radio system spatially close to cell 10 in FIG. 1 is generating a signal having a frequency $F_1$, communication in cell 10 of the system could be impaired or interrupted depending on the strength and spatial location of the inferring signal.

In order to reduce interference from other systems and devices, all cells in each cell group are directed to "hop" to another frequency in the group of frequencies available to the system at a predetermined time. FIG. 2 shows the frequency distribution of the cell groups after a frequency hop according to the present invention. As shown in this Figure, each cell in each cell group changed frequencies. In particular, each cell hopped up one frequency position (for example, cell 10 hopped from $F_1$ to $F_2$). It is noted that the change in frequency use or allocation for each cell should be synchronized. This ensures that any co-channel interference between cells remains constant, enabling better canceling techniques. Referring to the example above, cell 10 had been receiving interference from a source producing a signal having frequency $F_1$. After the frequency hop, cell 10 is assigned frequency $F_2$. The interference from the source may then be reduced for cell 10.

An exemplary timing diagram for synchronized frequency hopping for the seven cell groups of FIGS. 1 and 2 is shown in FIG. 3.

Seven time periods, $T_1$ to $T_7$, are shown in FIG. 3. Time period T represents the frequency assignments depicted in FIG. 1. Time period $T_2$ represents the frequency assignments depicted in FIG. 2. Cell A to Cell G represents the cells in each seven cell group. In particular, cell A is cell 10 in one seven cell group and the identification of the remaining cells can be determined by reference to FIG. 1 and time slot $T_1$. As shown in FIG. 3, after each time interval, all the cells of each seven cell group hop to new frequencies at the same time. This continues from time slot $T_1$ to time slot $T_7$ and then the pattern repeats (back to the pattern show for time slot $T_1$). In this embodiment, each cell moves to the next frequency $F_x$ where x is from 1 to 7. Thus, for each cell x is incremented by 1 at the start of each new time slot (moves from $F_x$ to $F_{x+1}$.) This occurs until x equals the last allocated frequency in the system, in this case, $F_7$. Then x is reset to 1. For example, cell G changes from frequency $F_7$ to $F_1$ between time slots $T_1$ and $T_2$.

It is noted that $F_1, F_2, \ldots F_7$ could represent frequencies assigned to a system in order of increasing frequency. In most frequency allocation schemes, a system is assigned contiguous frequencies. To reduce the possibility that a signal from a non-system source does not interfere with a cell's communications for two successful time intervals, frequencies $F_1$ to $F_7$ could be assigned randomly from all the frequencies available for the system. In addition, random frequency hopping may reduce co-channel interface between neighboring cells having adjacent frequency assignments prior to a hop. Thus, the synchronized frequency hopping method and apparatus of the present invention helps prevent continual interference from a non-system source for any cell in the system. The time slots $T_1$ to $T_7$ shown in FIG. 3 are approximately equal in length. In another embodiment of the invention, the length slots may vary in length.

It radio communication systems, the cells (shown in FIG. 1) communicate with devices located in or near the cells where the devices may be a cellular phone, pager, or any other radio communication device. The devices may receive timing signals indicating they need to hop to new frequency when the cell does. If the cells hop using a known pattern (as shown in FIG. 3), the devices (along with the cell) would automatically know which frequency to hop to after each time interval. This technique may reduce the complexity of the radio communication devices. It the pattern is not known by the devices, the pattern could be communicated to the mobile devices in a fixed broadcast management message.

Further, in one embodiment of the invention, each radio device could be programmed to transceive a single frequency $F_1$ to $F_7$. Such a radio device would wait for the cell it is located in to frequency hop the frequency the device is programmed to transceive. For example, if a device Y is in cell A and programmed to transceive frequency, $F_3$, device Y would be able to communicate with cell A during each occurrence of time slot $T_3$ (every seven time slots). If device Y moves so that it now located in cell F, the device would communicate during the occurrence of every time slot $T_5$.

Figure 4:
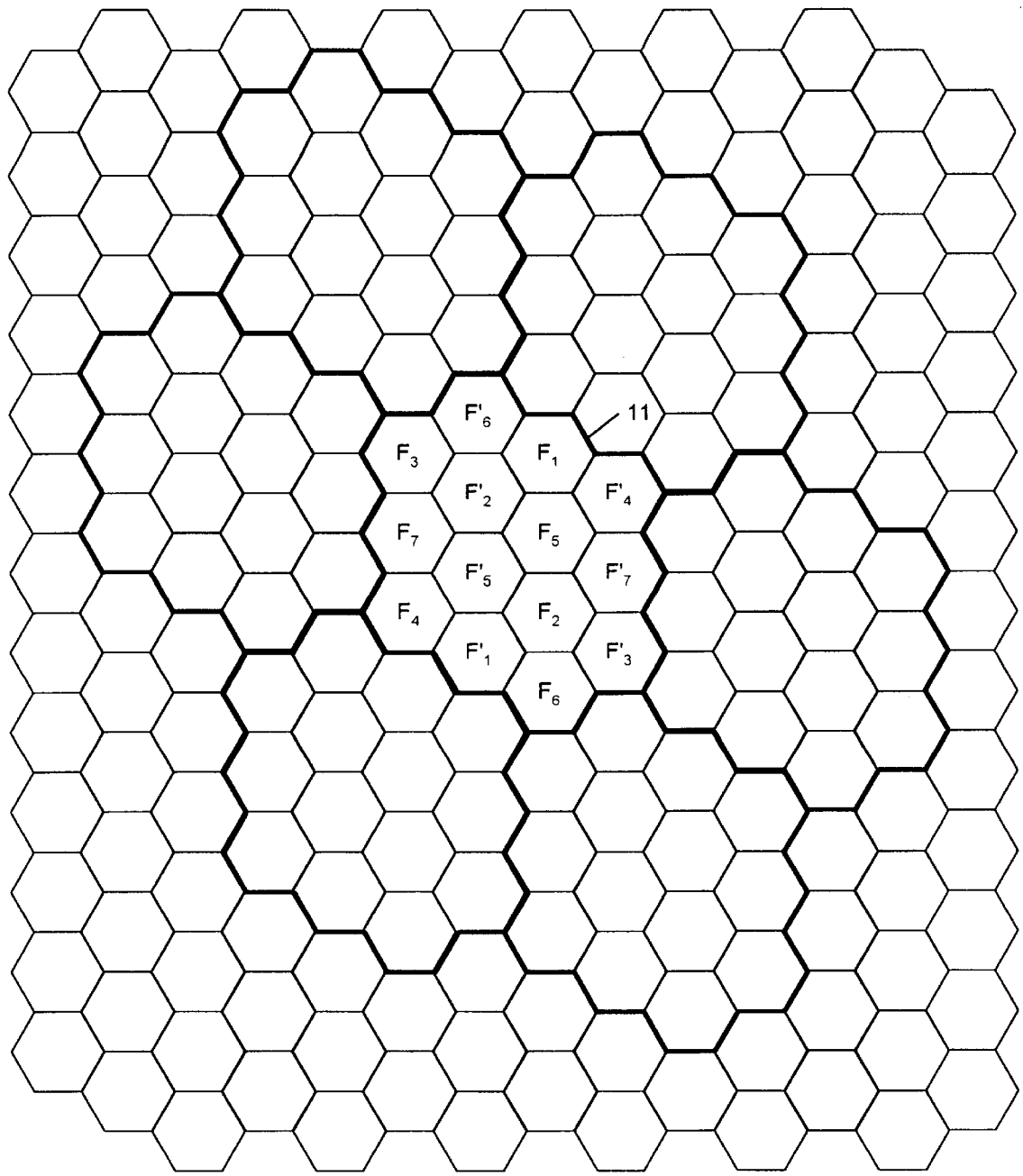
FIG. 4 is a block diagram of a cell configuration showing a frequency reuse pattern for a fourteen cell group configuration.
Figure 5:
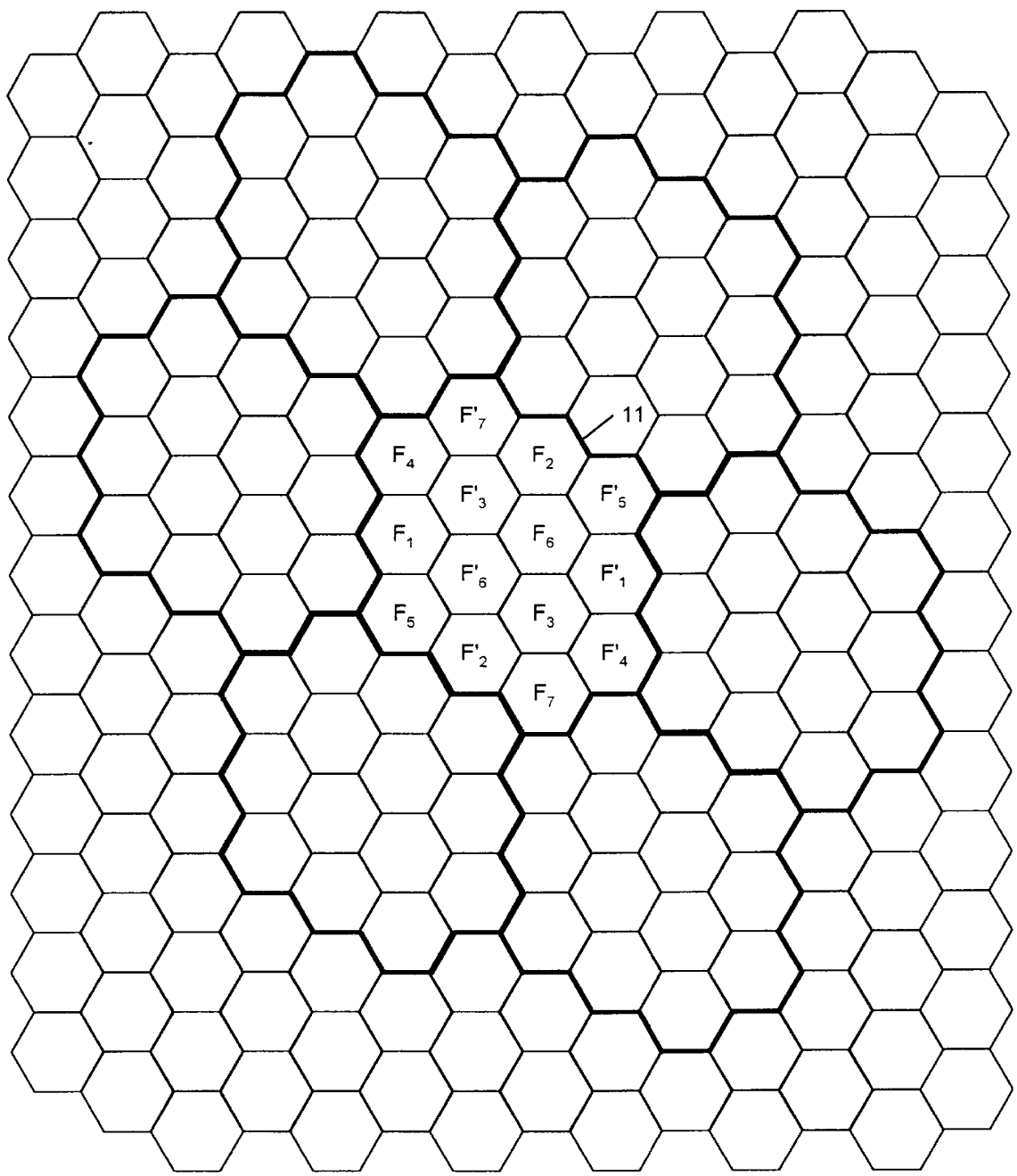
FIG. 5 is a block diagram of the cell configuration of FIG. 4 after a synchronized frequency hop.
Figure 6:
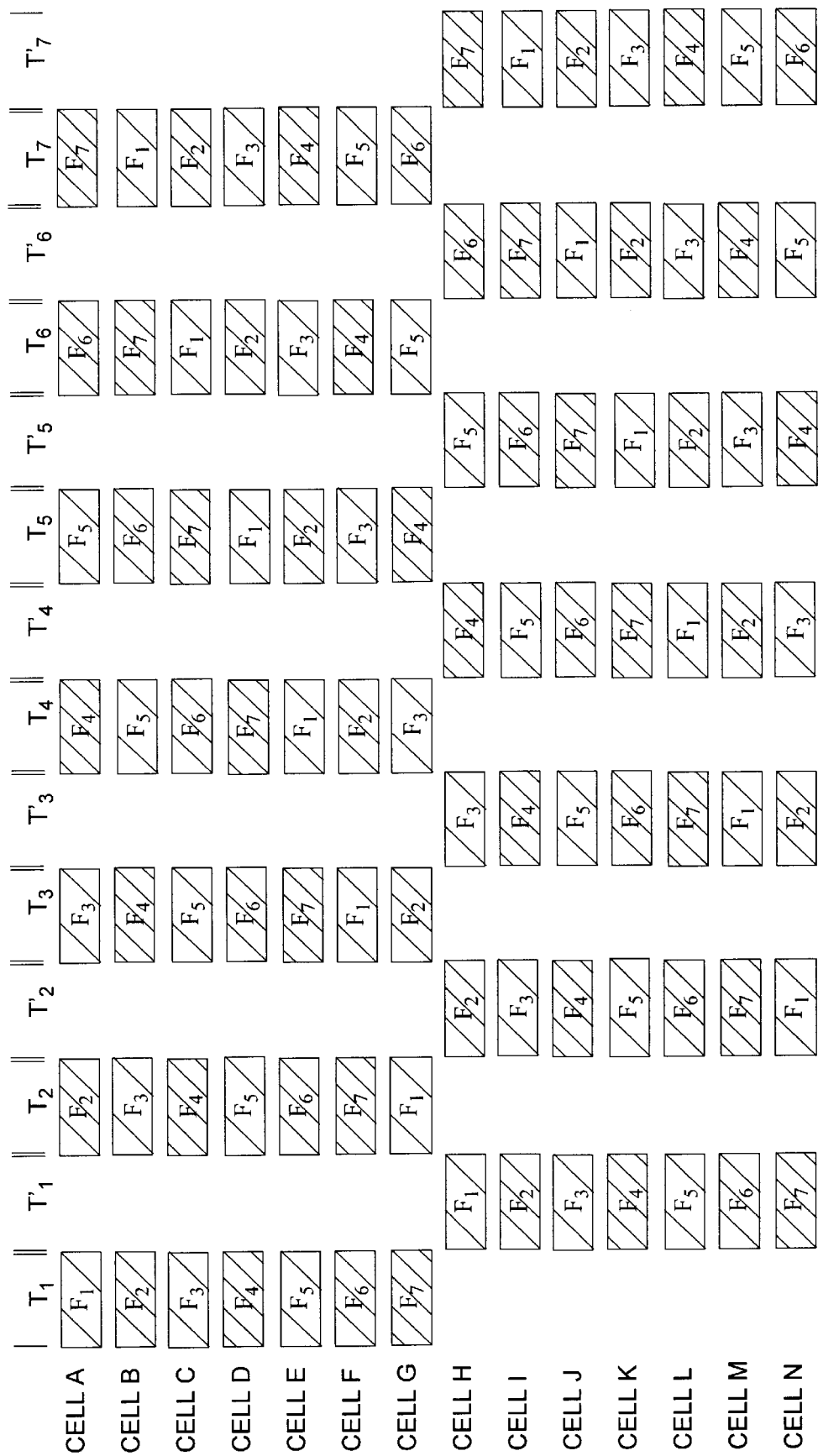
FIG. 6 is a timing diagram showing a synchronized shared frequency hopping pattern for the fourteen cell group configuration depicted in FIGS. 4 and 5.

FIGS. 4, 5, and 6 illustrate a second embodiment further including a technique for reducing co-channel interference between cells in a system having limited frequencies available. In the system shown in FIG. 1, there are only seven frequencies available, $F_1$ to $F_7$. By time sharing frequencies between cells, co-channel interference can reduced although system capacity is reduced. FIGS. 4, 5, and 6, illustrate an embodiment of the invention which reduces both non-system interference as taught by the embodiment shown in FIGS. 1,2, and 3, and also reduces co-channel interference between cells in the system by time sharing of the limited frequencies available. As shown in FIG. 4, this embodiment has cell groups comprising fourteen cells, where the cells are assigned frequencies $F_1$ to $F_7$ and $F'_1$ to $F'_7$ where $F_x$ and $F'_x$ denote the same frequency x at different time periods, T and T' (as shown in FIG. 6.) For example, as shown in FIG. 5 and FIG. 6, during time slots $T_1$ and $T'_1$, the fourteen cell group shares the seven frequencies by alternating the use of the seven frequencies between two sets of seven cells within each group of fourteen cells. In particular, during time slot $T_1$ (or during the non-primed time slots) cells A to G use frequencies $F_1$ to $F_7$. During the second time slot $T'_1$ (or during the primed time slots), cells H to N use frequencies $F_1$ to $F_7$. This technique reduces co-channel interference between the fourteen cells of the cell group and also neighboring cell groups.

In order to also reduce interference from non-system sources, the frequency assignments synchronously hop after each set of non-primed and primed time slots. FIG. 4 represents frequency assignments during time slots $T_1$ and $T'_1$. FIG. 5 represents the frequency assignments for the cells during time slots $T_2$ and $T'_2$ after a frequency hop has been performed. Thus, for example, cell 11 hops from frequency $F_1$ to $F_2$ between time slot $T_1$ and time slot $T_2$. As shown in FIGS. 5 and 6, each cell hops to a new frequency (based on its previous assignment) after each set of non-primed and primed time slots. This pattern continues to $T'_7$ and then repeats. This embodiment, thus reduces both co-channel system and non-system interference.

Figure 7:
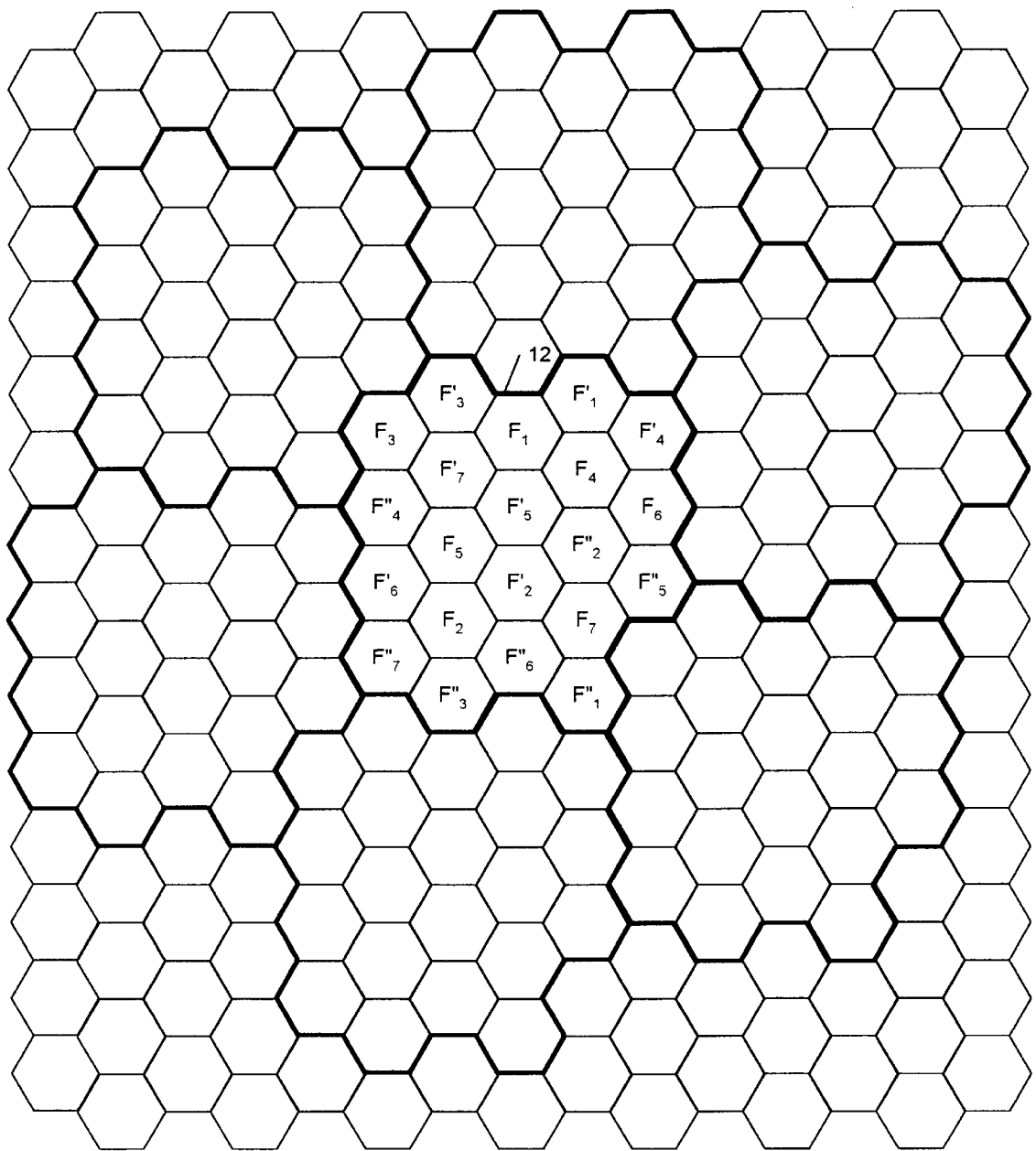
FIG. 7 is a block diagram of a cell configuration showing a frequency reuse pattern for a twenty one cell group configuration.
Figure 8:
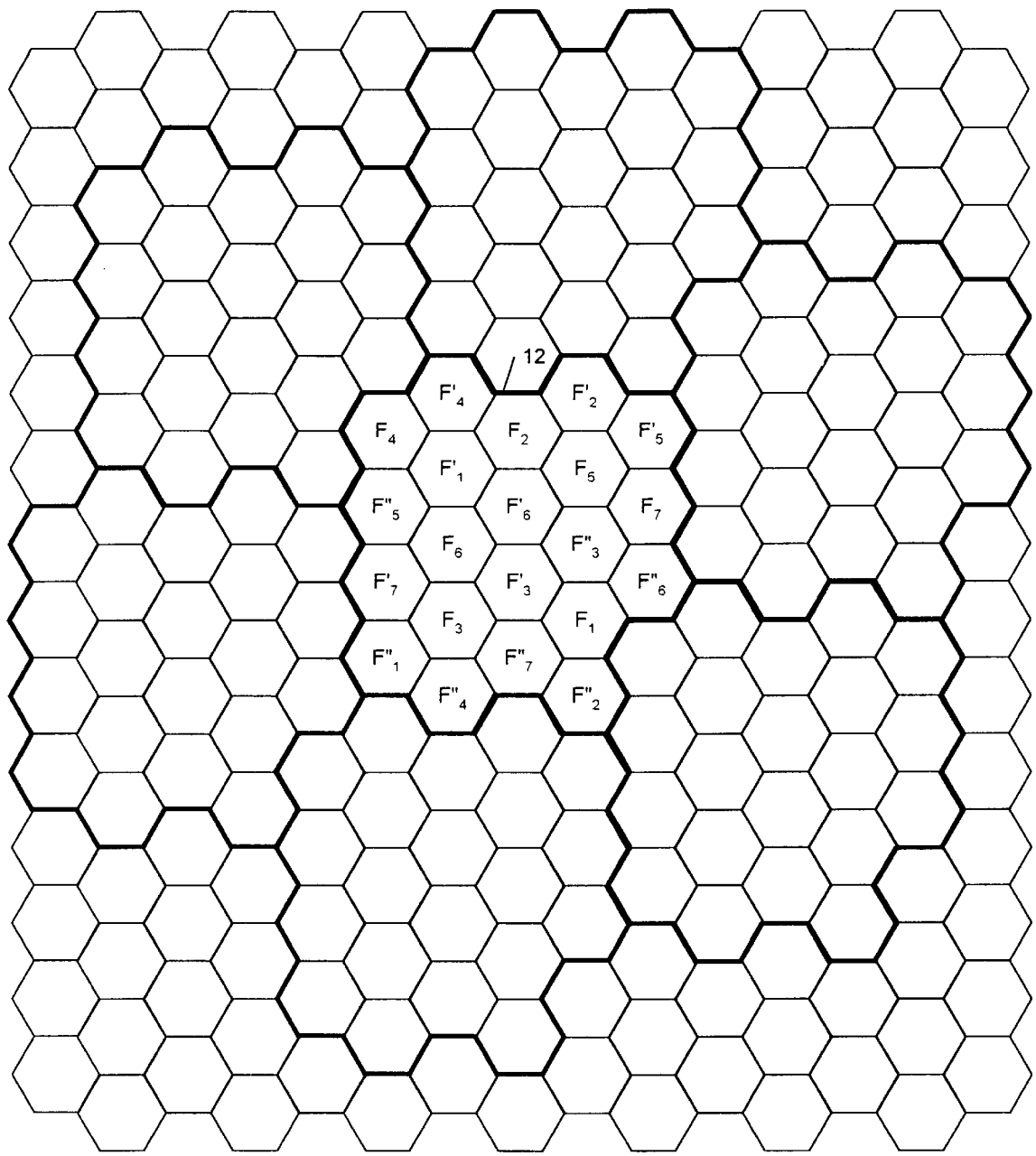
FIG. 8 is a block diagram of the cell configuration of FIG. 7 after a synchronized frequency hop.
Figure 9:
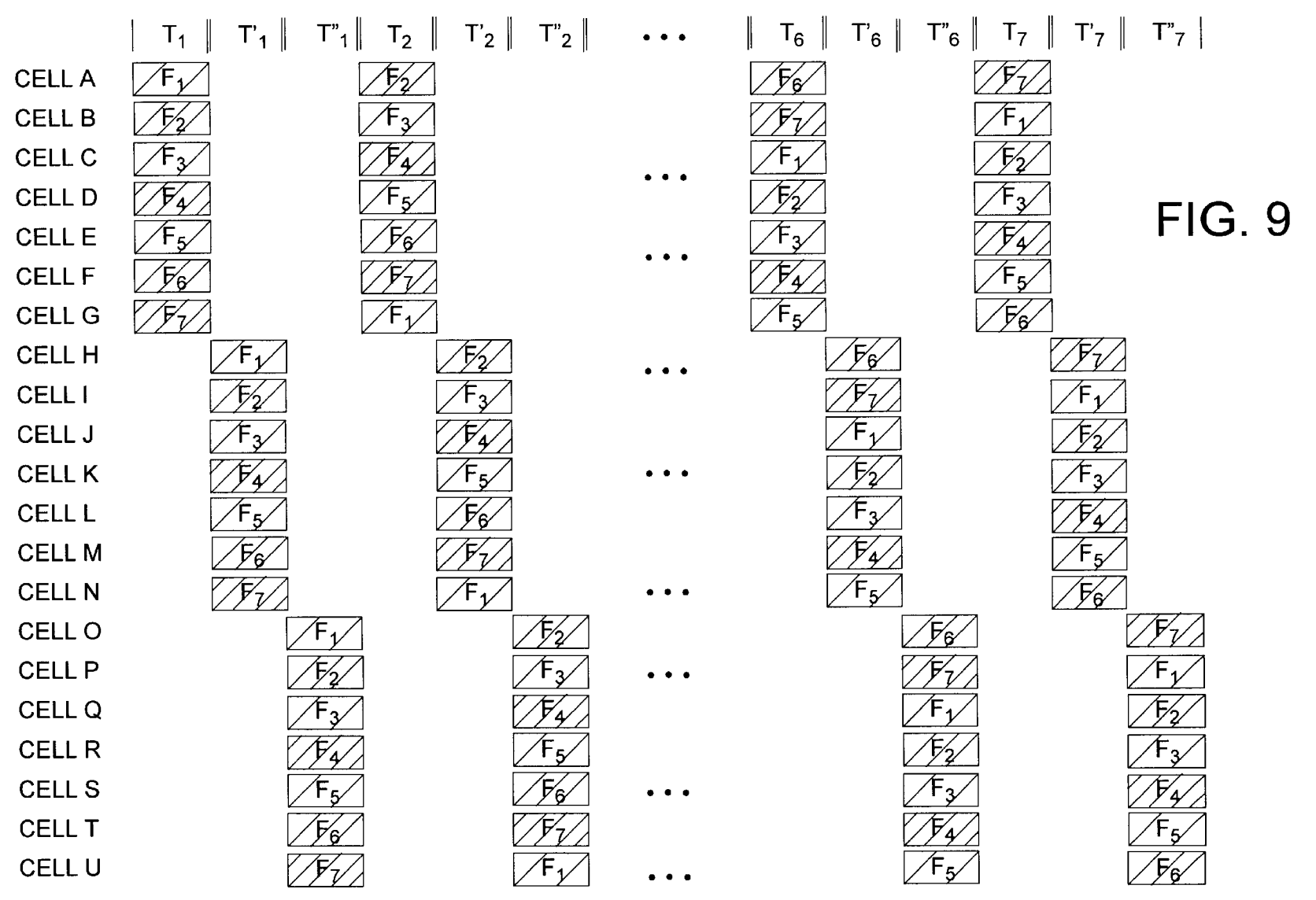

FIGS. 7, 8, and 9 illustrate another embodiment of the invention that further reduces co-channel interference and provides synchronized frequency hopping. As shown in FIGS. 7 and 8, each cell group contains twenty-one cells. The twenty-one cells are grouped into three groups of seven cells (because there are seven frequencies in the system) where the cells are assigned frequencies $F_1$ to $F_7$, $F'_1$ to $F'_7$ and $F''_1$ to $F''_7$ where $F_x$, $F'_x$ and $F''_x$ denote the same frequency x at different time periods, T, T'and T'' (as shown in FIG. 9.) As shown in FIG. 8 and FIG. 9, during time slots $T_1$, $T'_1$, and $T''_1$, the twenty-one cell group shares the seven frequencies by alternating the use of the seven frequencies between three sets of seven cells within the group of twenty-one cells. In particular, during time slot $T_1$ (or during the non-primed time slots) cells A to G use frequencies $F_1$ to $F_7$. During the second time slot $T'_1$ (or during the primed time slots), cells H to N use frequencies $F_1$ to $F_7$ and during the third time slot $T''_1$ (or during the double primed time slots), cells O to U use frequencies $F_1$ to $F_7$ This reuse pattern further reduces co-channel interference between the cells of the cell groups and neighboring cell groups.

In order to also reduce interference from non-system sources, cells synchronously hop frequency assignments after each set of time slots (unprimed, primed, and double-primed).

FIG. 7 represents frequency assignments during time slots $T_1$, $T'_1$, and $T''_1$. FIG. 8 represents the frequency assignments for the cells during time slots $T_2$, $T'_2$, and $T''_2$ after a frequency hop. Thus, for example, cell 12 hops from frequency $F_1$ to $F_2$ between time slot $T_1$ and time slot $T_2$. As shown in FIGS. 8 and 9, each cell hops to a new frequency (based on its previous assignment) after each set of non-primed, primed and double-primed time slots. This pattern continues to $T''_7$ and then repeats. This embodiment, thus further co-channel system interference while reducing non-system interference.

Figure 10:
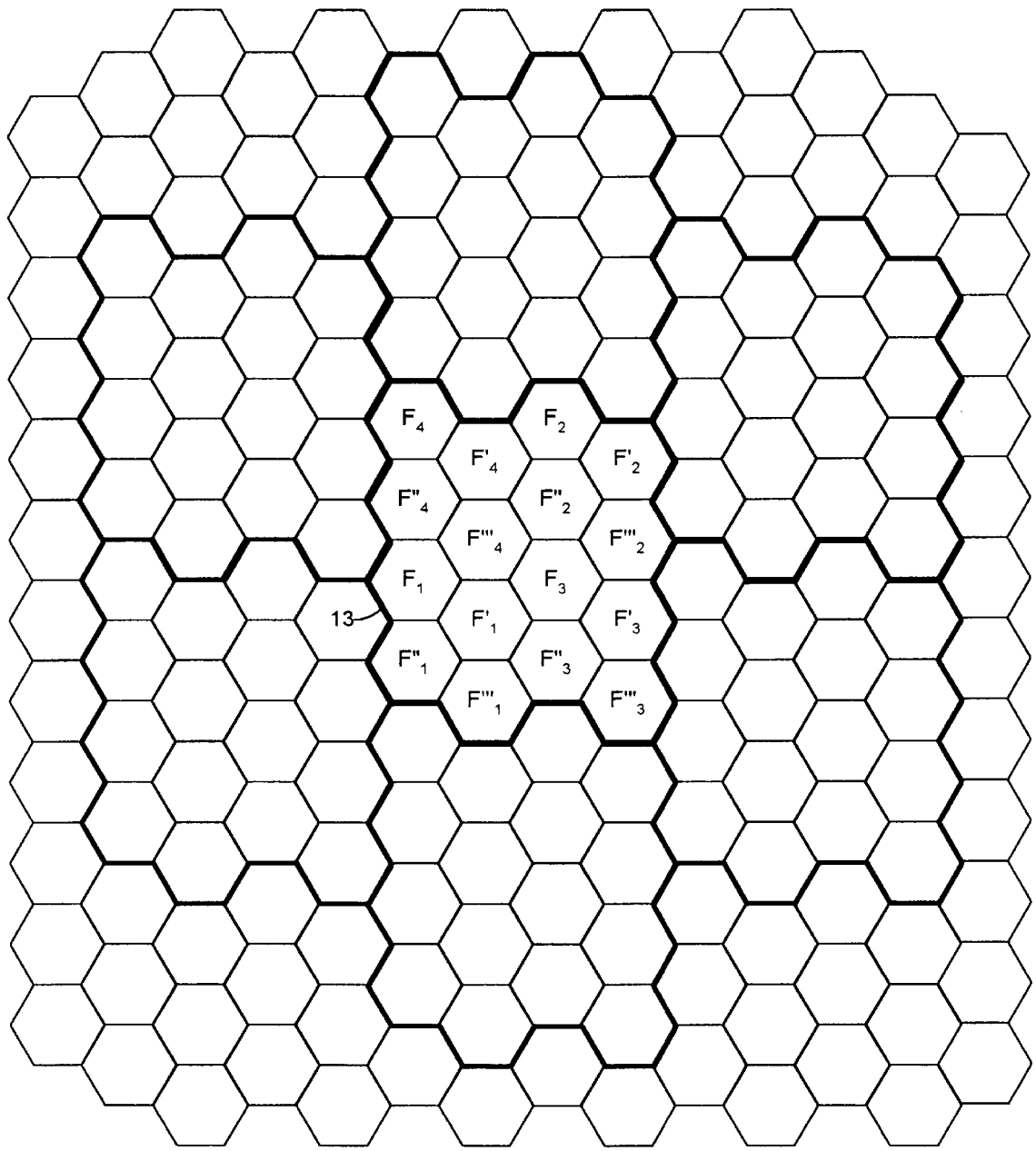
FIG. 10 is a block diagram of a cell configuration showing a frequency reuse pattern for a sixteen cell group configuration.
Figure 11:
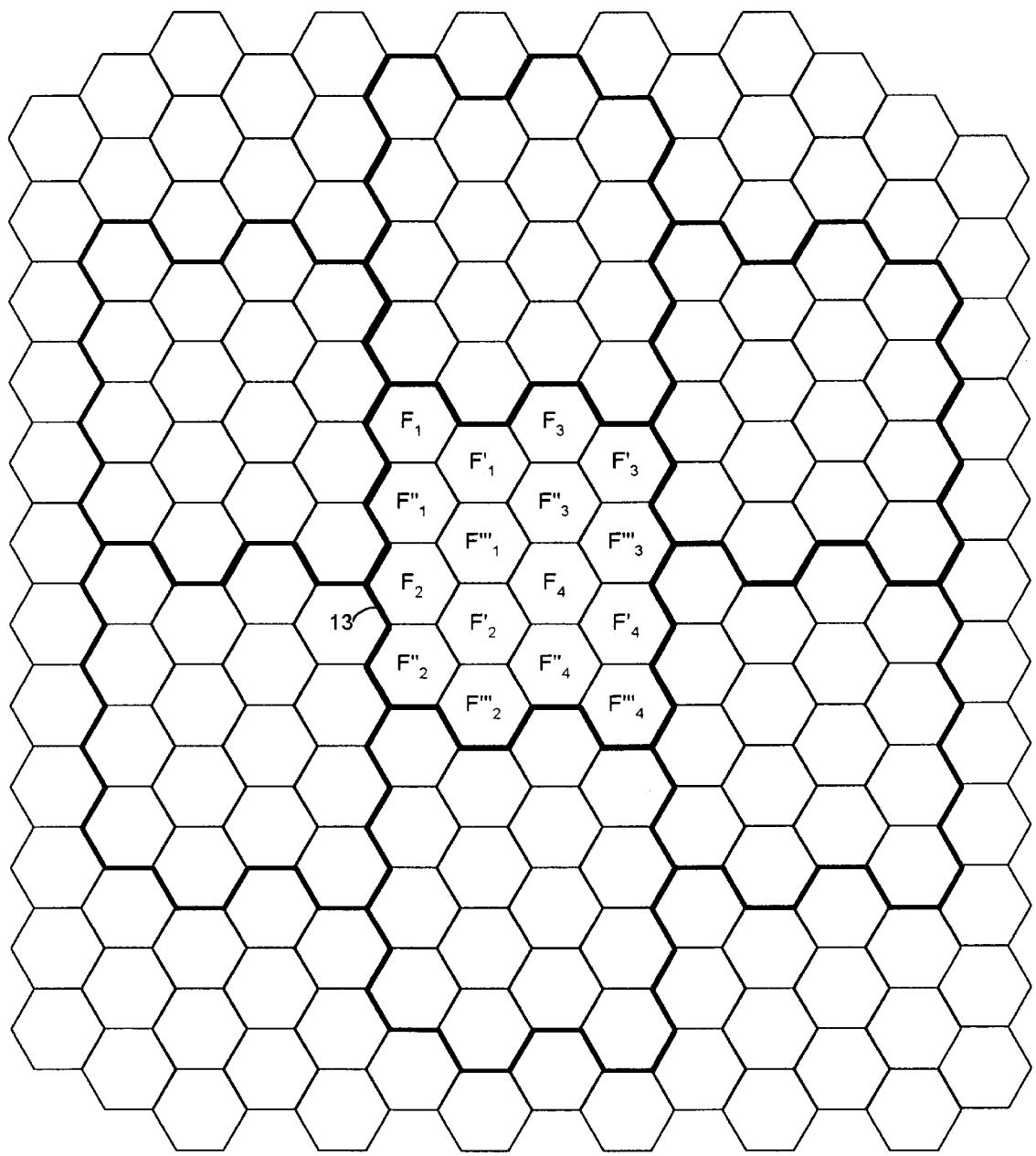
FIG. 11 is a block diagram of the cell configuration of FIG. 10 after a synchronized frequency hop.
Figure 12:
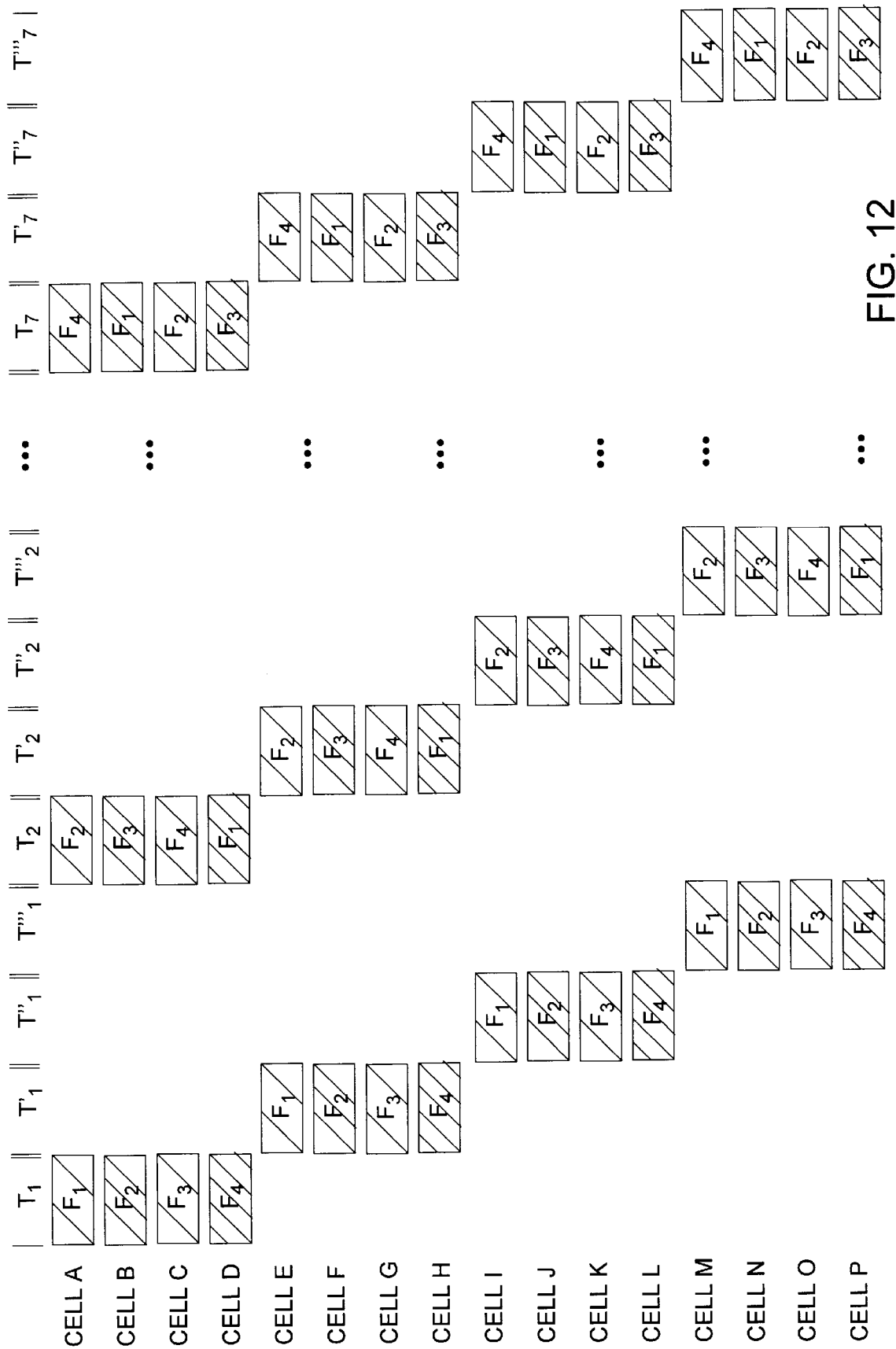
FIG. 12 is a timing diagram showing a synchronized shared frequency hopping pattern for the sixteen cell group configuration depicted in FIGS. 10 and 11.

FIGS. 10, 11, and 12 illustrate another embodiment of the invention. In this embodiment, the system has only been assigned four frequencies, $F_1$ to $F_4$. In order to reduce co-channel interference, the system groups four sets of four cells into a sixteen cell group and shares the four frequencies between these sixteen cells where the cells are assigned frequencies $F_1$ to $F_4$, $F'_1$, to $F'_4$, $F''_1$ to $F''_4$ and $F'''_1$ to $F'''_4$ where $F_x$, $F'_x$, $F''_x$ and $F'''_x$ denote the same frequency x at different time periods, T, T', T'' and T''' (as shown in FIG. 12.) In particular, as shown in FIG. 11 and FIG. 12 during time slots $T_1$, $T'_1$, $T''_1$, and $T'''_1$, the sixteen cell group shares the four frequencies by alternating the use of the four frequencies between the four sets of four cells. In order to also reduce interference from non-system sources, cells also synchronously hop frequency assignments after each set of time slots. FIG. 10 represents frequency assignments during time slots $T_1$, $T'_1$, $T''_1$ and $T'''_1$. FIG. 11 represents the frequency assignments for the cells during time slots $T_2$, $T'_2$, $T''_2$ and $T'''_2$ after a frequency hop. Thus, for example, cell 13 hops from frequency $F_1$ to $F_2$ between time slot $T_1$ and time slot $T_2$. As shown in FIGS. 11 and 12, each cell hops to a new frequency (based on its previous assignment) after each set of non-primed, primed, double, and triple primed time slots. This pattern continues to $T'''_4$ and then repeats.

Figure 13:
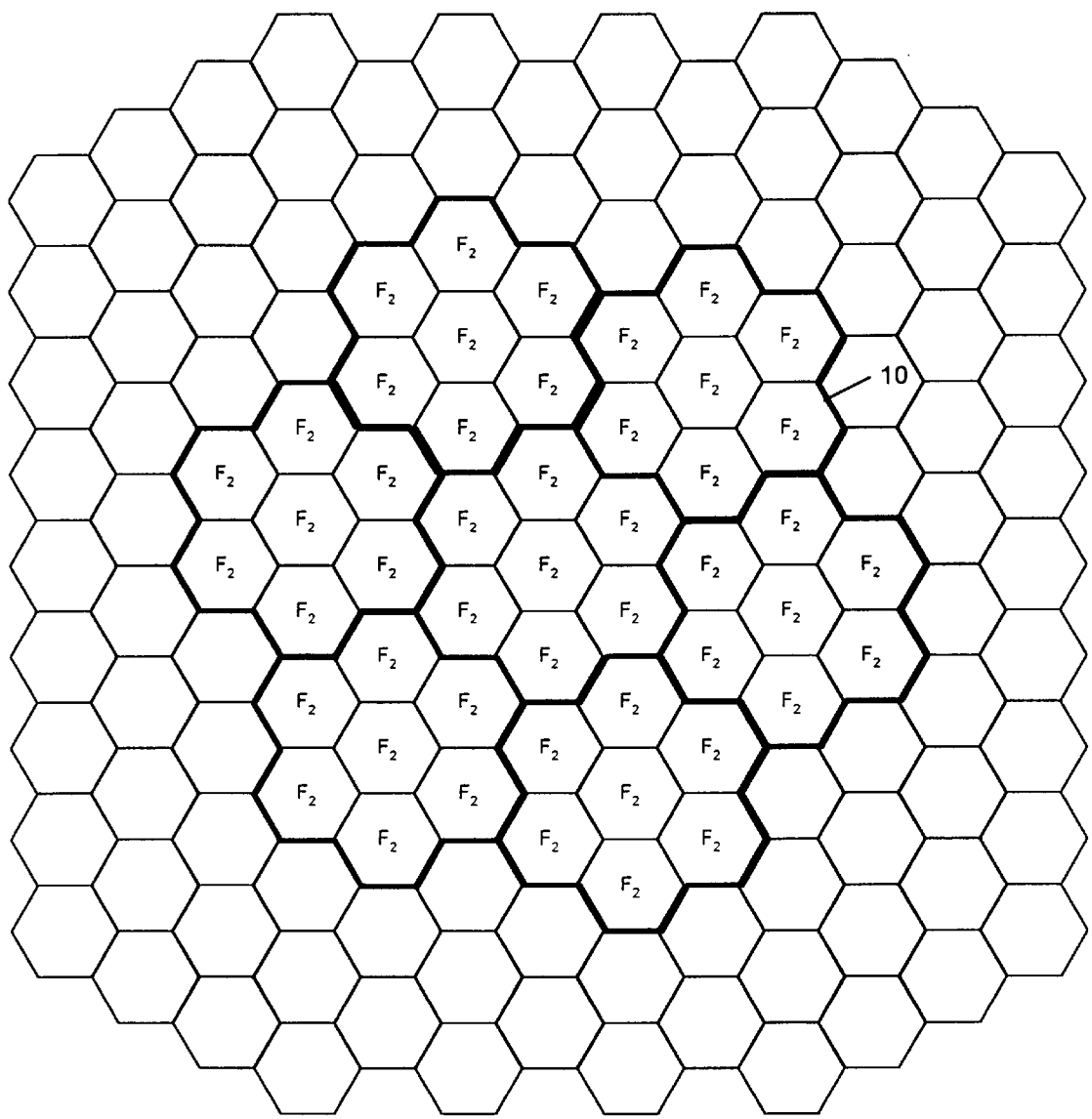
FIG. 13 is a block diagram of the cell configuration of FIG. 1 after a synchronized frequency hop to a simulcast frequency, $F_2$.
Figure 14:
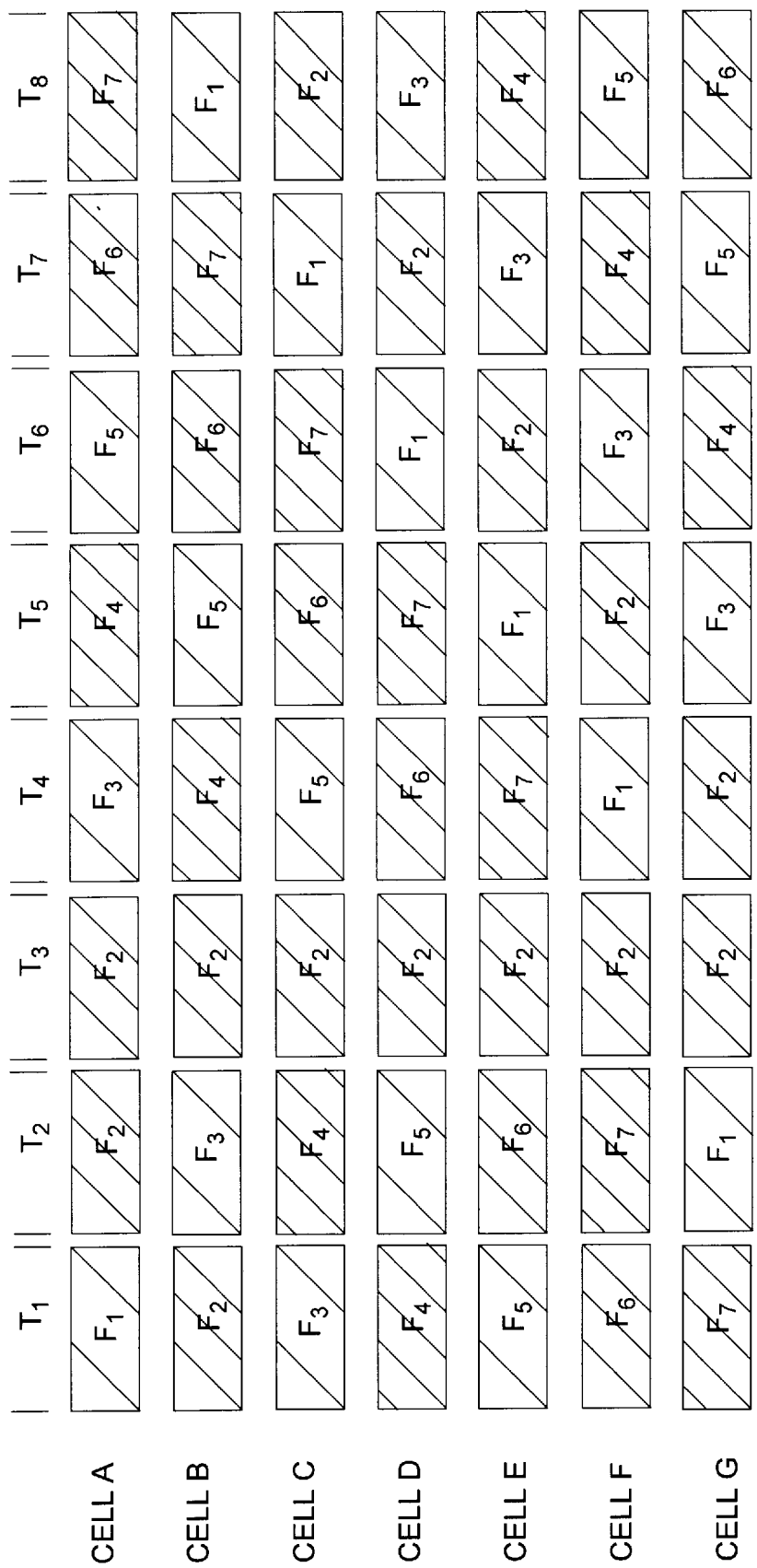
FIG. 14 is a timing diagram showing a synchronized frequency hopping pattern including a hop to a simulcast frequency for the seven cell group configuration depicted in FIGS. 1, 2, and 13.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims. Another embodiment. for example. is shown in FIGS. 13 and 14. In this embodiment, all the cells hop to a simulcast frequency (in this embodiment $F_2$) after a time slot. $T_2$, and then continue their frequency hopping pattern shown in FIG. 3, during time slot $T_4$.

Figure 15:
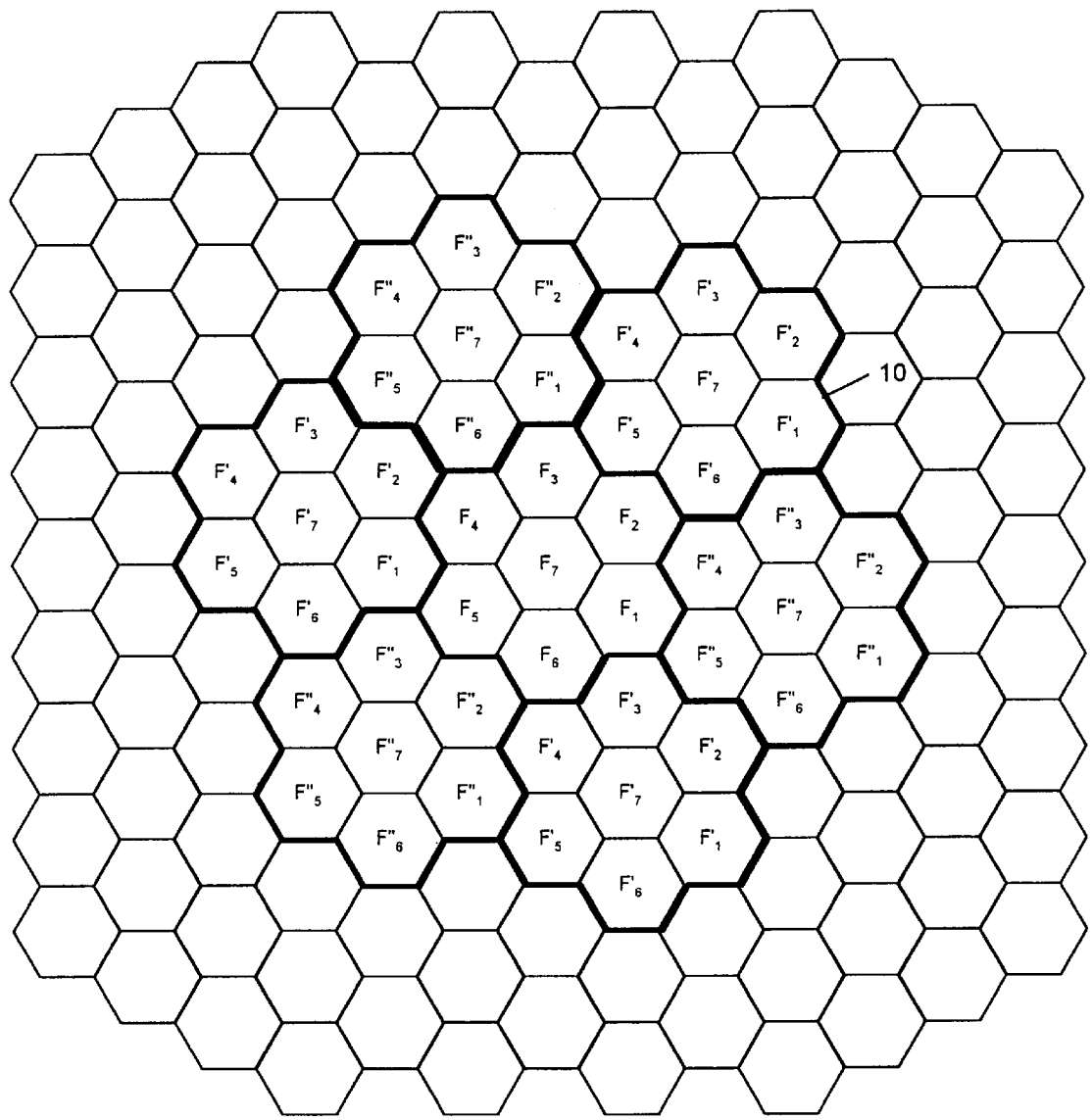
FIG. 15 is a block diagram of a cell configuration showing another frequency reuse pattern for a twenty one cell group configuration.
Figure 16:
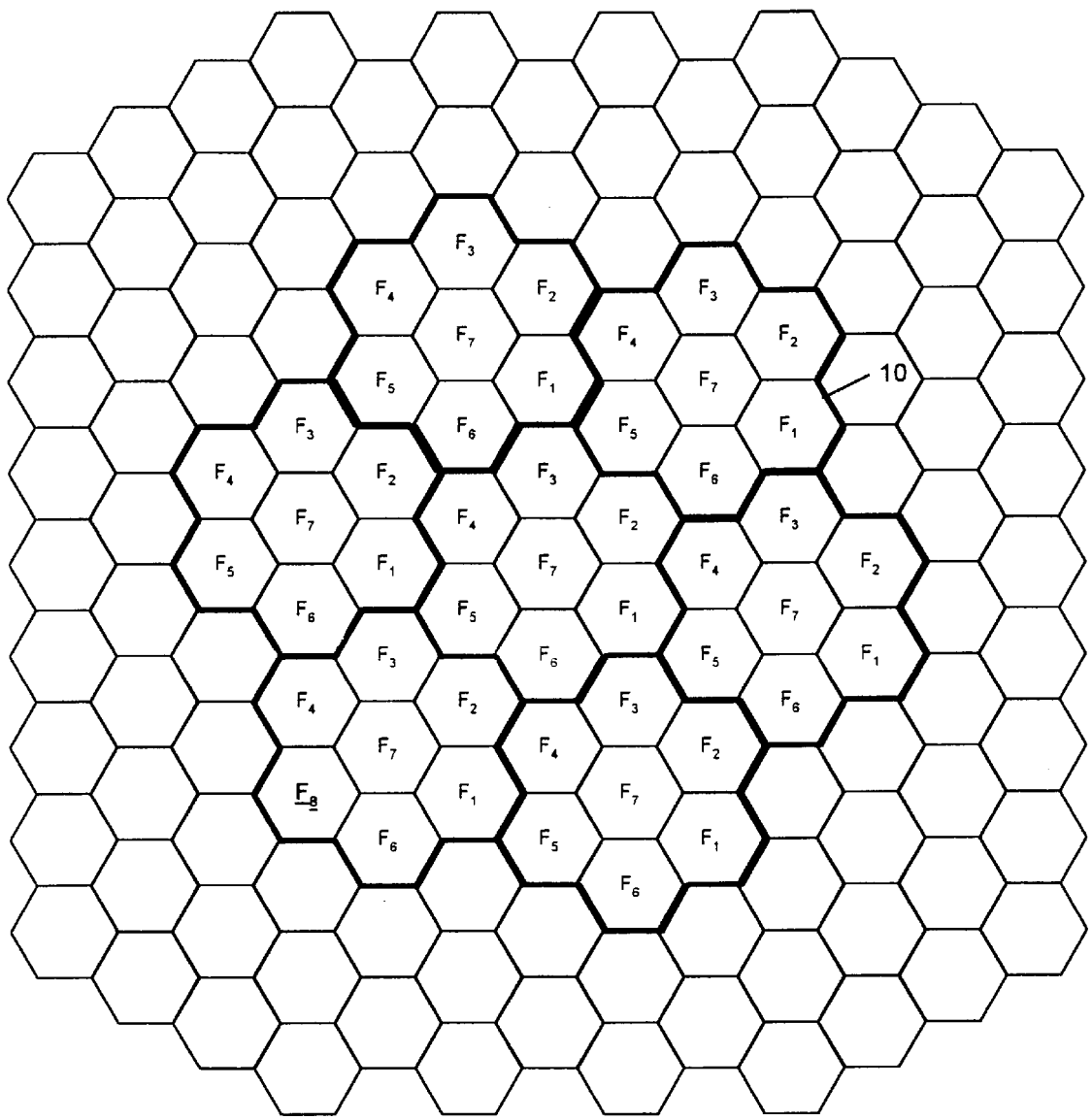
FIG. 16 is a block diagram of a prior art cell configuration showing a frequency reuse pattern for a seven cell group configuration where the reuse pattern includes a limited use frequency, $F_8$.
Figure 17:
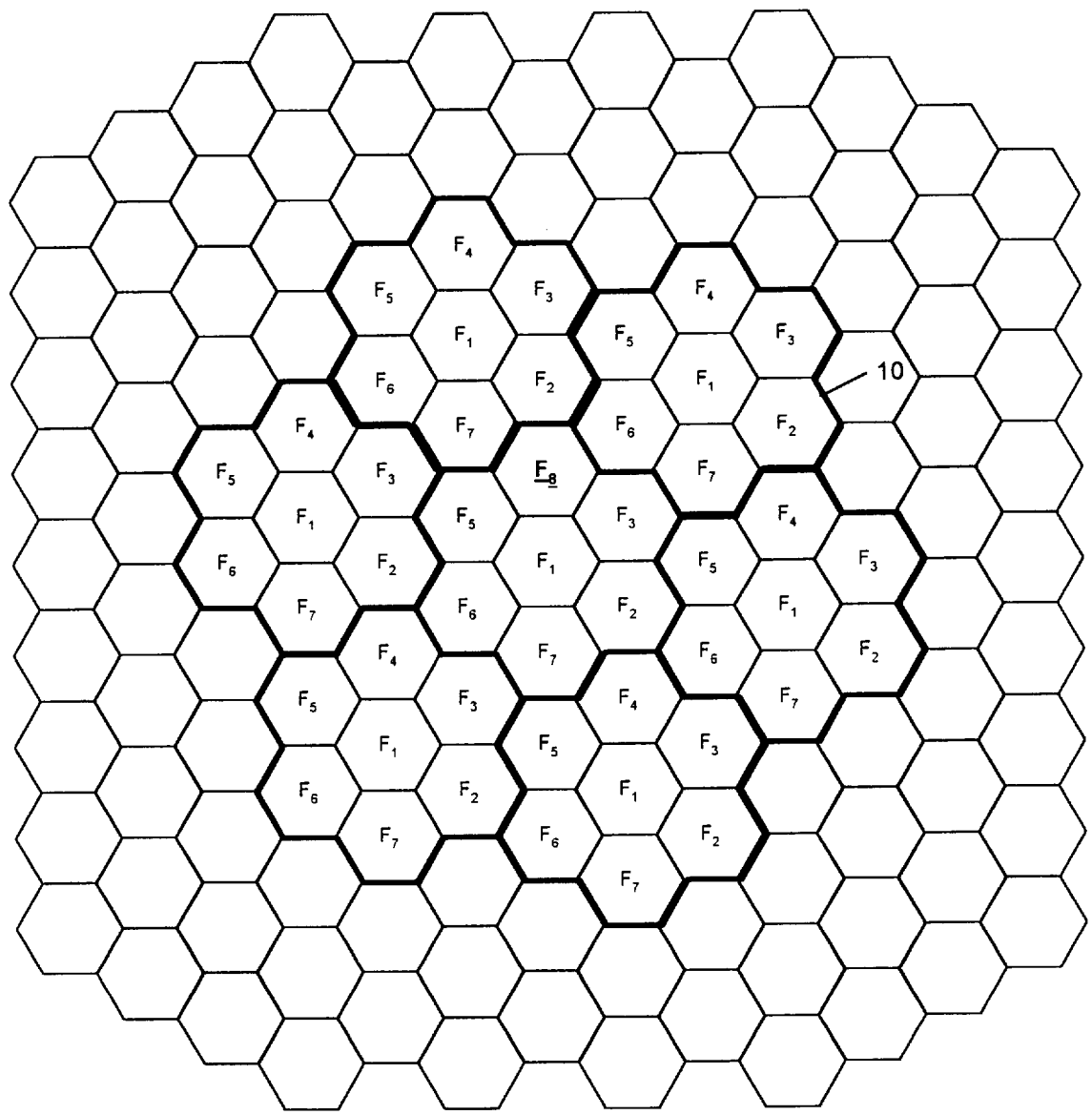
FIG. 17 is a block diagram of the cell configuration of FIG. 16 after a synchronized frequency hop.

The present invention is also not limited to the particular patterns disclosed. For example, another twenty-one cell pattern for a system having seven frequencies is shown in FIG. 15. During each time slot, T, T' and T'', a different group of seven cells uses frequencies $F_1$ to $F_7$., as describer earlier, where the cells are assigned frequencies $F_1$ to $F_7$, $F'_1$ to $F'_7$ and $F''_1$ to $F''_7$ where $F_x$, $F'_x$ and $F''_x$ denote the same frequency x at different time periods, T, T' and T'' Another embodiment of the invention is also shown in FIGS. 16 and 17.

In this embodiment of the invention, there are eight frequencies available. Only seven of the eight available frequencies are used in the normal frequency hopping scheme as shown in FIGS. 1,2, and 3. The eighth frequency, $F_8$, is used by only a limited number of the cells of the system during each time slot. FIGS. 16 and 17 depict the frequency assignments of the cells for a time slot $T_x$ and $T_{x+1}$. As can be seen from these Figures, in this particular embodiment of the invention, frequency $F_8$ is only used by a single cell in each time slot where the cell returns to the appropriate frequency in the hopping pattern during the following time slot. The extra frequency $F_8$ may be used by more than cell in the system where the cells are sufficiently separated to prevent co-channel interference. This technique may also be employed in the embodiments of this invention.

What is claimed is:

1. A method for reusing frequencies in a cellular communication system having a first plurality of frequencies and a second plurality of cells, comprising the steps of:
   (a) allocating said first plurality of frequencies to a first sub-set of said second plurality of cells so that each cell of said first sub-set of said second plurality of cells has one of the first plurality of frequencies allocated to it; and
   (b) synchronously reallocating said first plurality of frequencies to said first sub-set of said second plurality of cells such that a same frequency of said first plurality of frequencies is synchronously reallocated to at least the voice channels of each cell of said first sub-set of said second plurality of cells for a predetermined period of time; and
   (c) synchronously reallocating said first plurality of frequencies to said first sub-set of said second plurality of cells such that a different frequency of said first plurality of frequencies is synchronously reallocated to at least the voice channels of each cell of said first sub-set of said second plurality of cells as a function of its previous allocation.

2. The method of claim 1, wherein a different frequency of said first plurality of frequencies is reallocated to each cell of said first sub-set of said second plurality of cells as a function of its previous allocation.

3. The method of claim 2, wherein cells having like frequency allocations prior to reallocation have like frequency allocations after reallocation.

4. The method of claim 1, wherein a different frequency of said first plurality of frequencies is randomly reallocated to each cell of said first sub-set of said second plurality of cells.

5. The method of claim 4, wherein cells having like frequency allocations prior to reallocation have like frequency allocations after reallocation.

6. The method of claim 1, further comprising the steps of:
   (c) allocating at least one of said first plurality of frequencies to selected ones of said second plurality of cells within sufficiently close range to cause significant co-channel interference with each other; and
   (d) periodically enabling each cell of said second plurality of cells having the same allocated frequency to transmit at least in part only during a time period in which no other cell allocated the same frequency is activated.

7. The method of claim 6, wherein the time period during which each selected one of said second plurality of cells is enabled to transmit on an allocated one of said first plurality of frequencies has the same duration as all selected ones of said second plurality of cells.

8. The method of claim 6, wherein the time period during which each selected one of said second plurality of cells is enabled to transmit on an allocated one of said first plurality of frequencies does not overlap any time period during which any selected one of said second plurality of cells is enabled to transmit on such allocated one of said first plurality of frequencies.

9. The method of claim 6, wherein said first plurality of frequencies comprise 7 frequencies, said first sub-set of said plurality of cells comprises 7 cells, and said selected ones of said second plurality of cells comprise 7 cells, and said first plurality of frequencies are allocated to cells in said second plurality of cells according to the pattern shown in FIG. 4.

10. The method of claim 6, wherein a different frequency of said first plurality of frequencies is reallocated to each cell of said first sub-set of said second plurality of cells as a function of its previous allocation.

11. The method of claim 6, wherein cells having like frequency allocations prior to reallocation have like frequency allocations after reallocations.

12. The method of claim 6, wherein each second plurality of cells is randomly allocated a different one of the first plurality of frequencies.

13. The method of claim 6, wherein said selected ones of said second plurality of cells comprise at least a second sub-set and a third sub-set of cells, said first plurality of frequencies comprise 7 frequencies, said first sub-set of said plurality of cells comprises 7 cells, said second sub-set of said plurality of cells comprises 7 cells, said third sub-set of said plurality of cells comprises 7 cells, and said first plurality of frequencies are allocated to cells in said second plurality of cells according to the pattern shown in FIG. 7.

14. A method for reusing frequencies in a cellular communication system having a first plurality of frequencies and a second plurality of cells, comprising the steps of:
   (a) allocating said first plurality of frequencies to a first sub-set of said second plurality of cells so that each cell of said first sub-set of said second plurality of cells has one of the first plurality of frequencies allocated to it;
   (b) synchronously reallocating said first plurality of frequencies to said first sub-set of said second plurality of cells such that a same frequency of said first plurality of frequencies is synchronously reallocated to at least the voice channels of each cell of said first sub-set of said second plurality of cells for a predetermined period of time;
   (c) synchronously reallocating said first plurality of frequencies to said first sub-set of said second plurality of cells such that a different frequency of said first plurality of frequencies is synchronously reallocated to at least the voice channels of each cell of said first sub-set of said second plurality of cells as a function of its previous allocation;
   (d) allocating at least one of said first plurality of frequencies to selected ones of said second plurality of cells within sufficiently close range to cause significant co-channel interference with each other; and
   (e) periodically enabling each cell of said second plurality of cells having the same allocated frequency to transmit at least in part only during a time period in which no other cell allocated the same frequency is activated.

* * * * *